G. G. FOREMAN.
Improvement in Plows.
No. 128,032. Patented June 18, 1872.
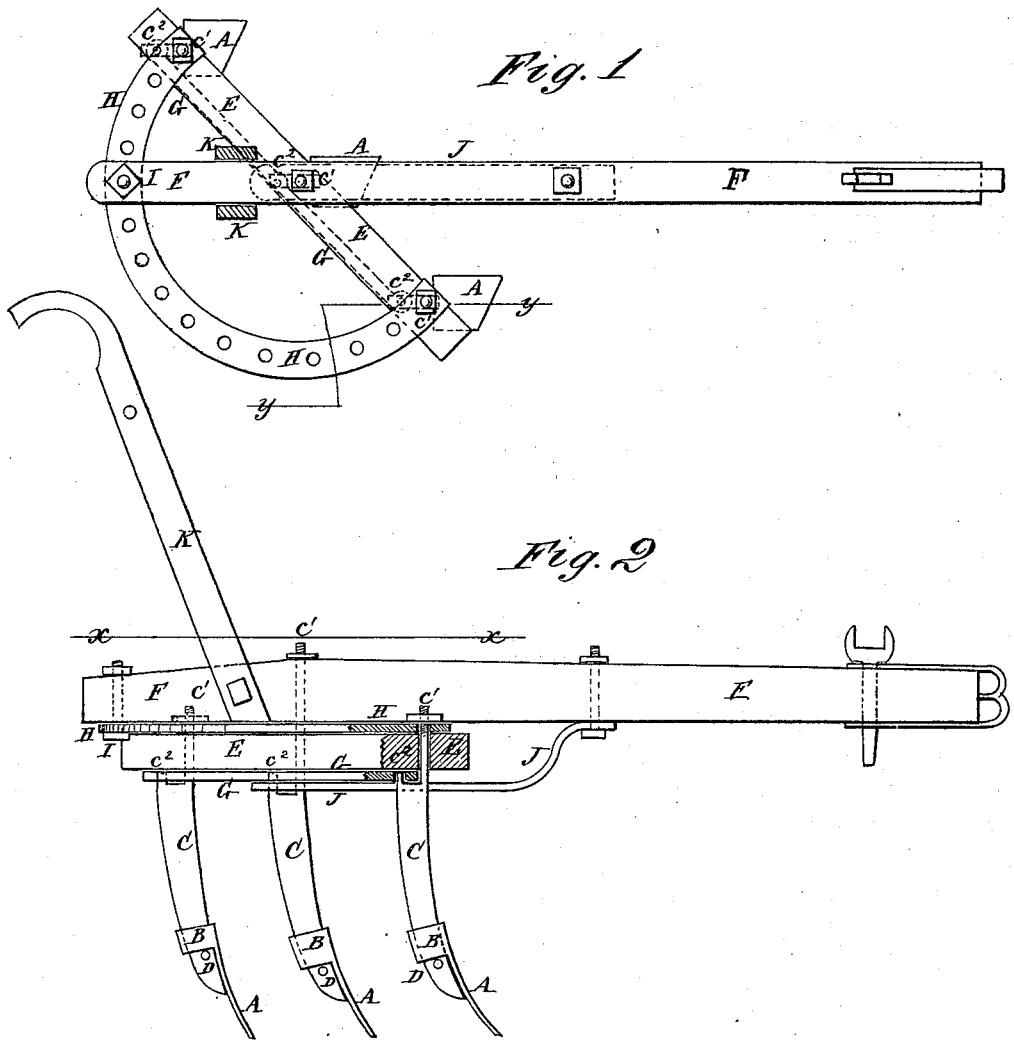
Witnesses:
A. W. Almqvist
W. A. Graham
Inventor:
G. G. Foreman.
per
Attorneys.

UNITED STATES PATENT OFFICE.

GLOVER G. FOREMAN, OF STOCKTON, GEORGIA.

IMPROVEMENT IN PLOWS.

Specification forming part of Letters Patent No. 128,032, dated June 18, 1872.

Specification describing a new and useful Improvement in Plow, invented by GLOVER G. FOREMAN, of Stockton, Clinch county, State of Georgia.

Figure 1 is a top view of my improved plow, the handles being cut off through the line $x\,x$, Fig. 2. Fig. 2 is a side view of the same, partly in section, through the line $y\,y$, Fig. 1.

My invention pertains to the combination of a notched or perforated adjusting-bar with the plow or shovel standards and a cross-bar, which is pivoted to the draft-beam, so that when said cross-bar is turned on its pivot the standards, and with them the plows or shovels, will be turned to keep them in proper position with reference to the line of motion or the desired operation on the soil.

A are the plow-plates, which may be shovel-plows, half-shovel plows, bull-tongues, sweeps, or other kind of plow-plates. Upon the rear side of the upper part of the plows A are formed, or to them are attached, sockets B, into which fit the lower ends of the plow-standards C, where they are secured in place by pins D driven through transverse holes in the lower part of the standards C, as shown in Fig. 2. The forward part of the standard C projects upward in the form of bolts $c^1$. The upper end $c^1$ of the central standard C passes up, through the center of the bar E, through the beam F, and is secured in place by a nut screwed upon its upper end. The upper end $c^1$ of the end standards C pass up through the ends of the cross-bar E, where they are secured by nuts. Upon the rear parts or shoulders of the upper ends of the standards C are formed small points or pivots $c^2$, which enter holes in the small metallic bar G, which extends along the rear part of the under side of the bar E.

By this arrangement the adjustment of the bar E at any given or desired angle to the beam F will cause the bar G to retain the two outer standards C and their plows in the same position relative to beam A. If the bar G were dispensed with, the outer or end plows would stand at a lateral inclination to the beam, which would be quite unsuitable for their functions.

H is a semicircular metallic bar, the ends of which are secured to the ends of the cross-bar E by the bolts $c^1$ of the plow-standards C. The semicircular bar H passes beneath the rear end of the beam F, to which it is secured by a bolt and nut, I. The bar H is perforated with numerous holes to receive the bolt I. By this construction, by removing the bolt I and loosening the nuts of the bolts $c^1$ the plows may be adjusted to work closer together or further apart, as may be desired. J is a brace, strap, or bar, the forward end of which is bolted to the beam F, and its rear end is secured to the upper part of the central standard C. K are the handles, which are attached to the rear part of the beam F, and which are connected and held in their proper relative position by a round, in the ordinary manner.

Having thus described my invention, I claim and desire to secure by Letters Patent—

The combination of the cross-bar G with the outer or end plow-standards and the cross-bar E, pivoted to the beam F and provided with an adjusting device, H, as shown and described, to operate as specified.

GLOVER G. FOREMAN.

Witnesses:
JOHN R. G. HAMILTON,
THOMAS D. HAWKINS.